United States Patent
Glocke et al.

(10) Patent No.: US 11,960,817 B2
(45) Date of Patent: Apr. 16, 2024

(54) WEB SITE PREVIEW BASED ON CLIENT PRESENTATION STATE

(71) Applicant: Microsoft Technology Licensing, LLC, Redmond, WA (US)

(72) Inventors: Joseph Michael Glocke, Seattle, WA (US); Archana Saseetharan, Sammamish, WA (US); Bhrighu Sareen, Kirkland, WA (US); Sukhmani Lamba, Bellevue, WA (US); Ankit Govil, Redmond, WA (US); David Pierre Claux, Redmond, WA (US); Saurav Majumder, Lynnwood, WA (US); Mao Yu, Bellevue, WA (US); Daniel Dong Joon Seong, Bellevue, WA (US); Aditya Chaudhry, Newcastle, WA (US); Nehal Balkrishna Bhagat, Vancouver (CA); Rahul Kishore Pinjani, Bellevue, WA (US); Mengli Elmendorf, Montgomery, NY (US)

( * ) Notice: Subject to any disclaimer, the term of this patent is extended or adjusted under 35 U.S.C. 154(b) by 0 days.

(21) Appl. No.: 17/752,658

(22) Filed: May 24, 2022

(65) Prior Publication Data
US 2023/0385524 A1    Nov. 30, 2023

(51) Int. Cl.
*G06F 40/106* (2020.01)
*G06F 16/955* (2019.01)
(Continued)

(52) U.S. Cl.
CPC .......... *G06F 40/106* (2020.01); *G06F 16/955* (2019.01); *G06F 16/9574* (2019.01); *G06F 40/14* (2020.01); *G06F 40/186* (2020.01)

(58) Field of Classification Search
None
See application file for complete search history.

(56) References Cited

U.S. PATENT DOCUMENTS

| 5,708,825 A | 1/1998 | Sotomayor |
| 5,890,172 A | 3/1999 | Borman et al. |

(Continued)

FOREIGN PATENT DOCUMENTS

| CN | 103425794 A | 12/2013 |
| CN | 108628870 A | 10/2018 |
| WO | 2010129088 A1 | 11/2010 |

OTHER PUBLICATIONS

"App Clips", Retrieved from: https://web.archive.org/web/20220325114934/https://developer.apple.com/app-clips/, Mar. 25, 2022, 4 Pages.

(Continued)

*Primary Examiner* — Maikhanh Nguyen
(74) *Attorney, Agent, or Firm* — Workman Nydegger

(57) ABSTRACT

The generation of a web site preview based on client presentation state of the client that will render the web site preview. Upon a service receiving a request to provide preview data for a web site preview corresponding to a web site identifier, the service determines client presentation state of the client(s) that is or are to render a web site preview using preview data that is to be provided in response to the request. The service selects a preview template at least in part based on the determined client presentation state. The service also populates the selected preview template with content from the web site to thereby generate preview data representing a preview of the web site identified by the web site identifier. The preview data is thus tailored to the presentation state of the client.

18 Claims, 9 Drawing Sheets

(51) Int. Cl.
  *G06F 16/957* (2019.01)
  *G06F 40/14* (2020.01)
  *G06F 40/186* (2020.01)

(56) References Cited

U.S. PATENT DOCUMENTS

| | | | |
|---|---|---|---|
| 7,031,968 B2* | 4/2006 | Kremer | H04L 67/02 707/706 |
| 7,159,188 B2 | 1/2007 | Stabb et al. | |
| 7,174,513 B1 | 2/2007 | Nickum et al. | |
| 7,383,248 B2 | 6/2008 | Chen | |
| 7,765,206 B2 | 7/2010 | Hillis et al. | |
| 7,814,425 B1 | 10/2010 | Oshaugnessy et al. | |
| 8,903,931 B1 | 12/2014 | Rothman et al. | |
| 8,949,370 B1 | 2/2015 | Wu et al. | |
| 9,542,365 B1 | 1/2017 | Rothman et al. | |
| 9,973,462 B1 | 5/2018 | Petersen | |
| 10,621,272 B1 | 4/2020 | Rose et al. | |
| 2002/0073058 A1* | 6/2002 | Kremer | G06Q 30/02 |
| 2002/0129114 A1 | 9/2002 | Sundaresan et al. | |
| 2003/0014415 A1* | 1/2003 | Weiss | G06F 16/9577 |
| 2004/0003351 A1 | 1/2004 | Sommerer et al. | |
| 2004/0205514 A1 | 10/2004 | Sommerer | |
| 2004/0267701 A1 | 12/2004 | Horvitz et al. | |
| 2004/0268231 A1* | 12/2004 | Tunning | G06F 40/154 715/236 |
| 2005/0022128 A1 | 1/2005 | Nicholas et al. | |
| 2005/0235203 A1 | 10/2005 | Undasan et al. | |
| 2005/0246643 A1 | 11/2005 | Gusmorino et al. | |
| 2006/0069617 A1 | 3/2006 | Milener et al. | |
| 2006/0101068 A1 | 5/2006 | Stuhec | |
| 2007/0038718 A1 | 2/2007 | Khoo et al. | |
| 2007/0180381 A1 | 8/2007 | Rice et al. | |
| 2008/0162529 A1 | 7/2008 | Stuhec | |
| 2009/0228804 A1* | 9/2009 | Kim | G06F 3/048 715/745 |
| 2010/0120456 A1 | 5/2010 | Karmarkar et al. | |
| 2010/0312641 A1 | 12/2010 | Zaibert et al. | |
| 2011/0145698 A1 | 6/2011 | Penov et al. | |
| 2011/0173569 A1 | 7/2011 | Howes | |
| 2011/0242601 A1 | 10/2011 | Takahashi | |
| 2012/0150989 A1 | 6/2012 | Portnoy | |
| 2012/0203929 A1 | 8/2012 | Patalsky | |
| 2012/0328259 A1 | 12/2012 | Seibert et al. | |
| 2013/0151936 A1* | 6/2013 | Hsu | G06F 16/957 707/E17.046 |
| 2013/0159445 A1* | 6/2013 | Zonka | H04L 51/10 709/206 |
| 2013/0262986 A1 | 10/2013 | Leblond et al. | |
| 2014/0040226 A1* | 2/2014 | Sadhukha | G06F 8/61 707/706 |
| 2014/0040770 A1 | 2/2014 | Khoo | |
| 2014/0108408 A1 | 4/2014 | Edgar et al. | |
| 2014/0136942 A1 | 5/2014 | Kumar et al. | |
| 2014/0245176 A1 | 8/2014 | Murali et al. | |
| 2014/0247278 A1 | 9/2014 | Samara et al. | |
| 2015/0026201 A1 | 1/2015 | Mukherjee | |
| 2015/0073922 A1 | 3/2015 | Farmer et al. | |
| 2015/0220499 A1 | 8/2015 | Katic | |
| 2015/0236979 A1 | 8/2015 | Kirillov et al. | |
| 2015/0347532 A1 | 12/2015 | Shaw et al. | |
| 2016/0092245 A1 | 3/2016 | Hogue et al. | |
| 2016/0092428 A1 | 3/2016 | Llic et al. | |
| 2016/0103861 A1 | 4/2016 | Jacob | |
| 2016/0180257 A1 | 6/2016 | Rees et al. | |
| 2016/0234267 A1* | 8/2016 | Hebbar | H04N 21/26258 |
| 2016/0323217 A1 | 11/2016 | Subramani et al. | |
| 2016/0334979 A1 | 11/2016 | Persson et al. | |
| 2017/0052943 A1 | 2/2017 | Owens et al. | |
| 2017/0097808 A1 | 4/2017 | Masterson et al. | |
| 2017/0111431 A1 | 4/2017 | Scoda et al. | |
| 2017/0111467 A1 | 4/2017 | Zhang | |
| 2018/0033064 A1 | 2/2018 | Varley | |
| 2018/0095604 A1 | 4/2018 | Nguyen et al. | |
| 2018/0260481 A1 | 9/2018 | Rathod | |
| 2018/0300217 A1 | 10/2018 | Doggett | |
| 2019/0102472 A1 | 4/2019 | Van Rensburg et al. | |
| 2019/0147178 A1 | 5/2019 | Baldwin et al. | |
| 2020/0272669 A1 | 8/2020 | Ebbesen et al. | |
| 2020/0311135 A1 | 10/2020 | Kligman et al. | |
| 2020/0344188 A1 | 10/2020 | Raskin et al. | |
| 2020/0351314 A1 | 11/2020 | Butcher et al. | |
| 2021/0034690 A1 | 2/2021 | Kim et al. | |
| 2021/0065254 A1 | 3/2021 | Zheng et al. | |
| 2023/0385363 A1 | 11/2023 | Glocke et al. | |
| 2023/0385525 A1 | 11/2023 | Glocke et al. | |

OTHER PUBLICATIONS

"The Verge", Retrieved from: https://www.theverge.com/, Mar. 30, 2022, 2 Pages.

Chen, et al., "Teams website tabs leads to customer confusion", Retrieved from: https://docs.microsoft.com/en-us/microsoftteams/troubleshoot/tabs/website-tabs-cause-confusion-teams, Mar. 8, 2022, 2 Pages.

U.S. Appl. No. 17/752,658, filed May 24, 2022.

"International Search Report and Written Opinion Issued in PCT Application No. PCT/US23/014199", dated Jun. 6, 2023, 13 Pages.

"International Search Report and Written Opinion Issued in PCT Application No. PCT/US23/014201", dated Jun. 12, 2023, 14 Pages.

"International Search Report and Written Opinion Issued in PCT Application No. PCT/US23/014209", dated Jun. 19, 2023, 14 Pages.

"Non Final Office Action Issued in U.S. Appl. No. 17/752,665", dated Feb. 16, 2023, 25 Pages.

"Non Final Office Action Issued in U.S. Appl. No. 17/752,675", dated Feb. 16, 2023, 15 Pages.

U.S. Appl. No. 17/752,665, filed May 24, 2022.

U.S. Appl. No. 17/752,675, filed May 24, 2022.

"Final Office Action Issued in U.S. Appl. No. 17/752,658", dated Aug. 11, 2023, 26 Pages.

"Notice of Allowance Issued in U.S. Appl. No. 17/752,665", dated Aug. 17, 2023, 12 Pages.

"Getting Started with Schema.org Using Microdata", Retrieved From: https://web.archive.org/web/20220523200400/https://schema.org/docs/gs.html, Retrieved Date: May 23, 2022, 5 Pages.

Non Final Office Action mailed on Dec. 7, 2023, in U.S. Appl. No. 17/752,675, 22 pages.

* cited by examiner

700A

1:15 PM

Hey Carol – you can track your client's arrival here: Flight Schedules: ABC Airlines Flight Status
ARRIVED

Passengers      Seat
John Doe      14A
Jane Doe      14B
Tommy Doe      14C

Flight      Departs      Arrives
AB613      2:20 AM      8:20 PM

Amsterdam Airport            San Francisco Airport
AMS      SFO

700B

WEB SITE PREVIEW BASED ON CLIENT PRESENTATION STATE

BACKGROUND

A Uniform Resource Locator (or URL) is a text string identifier that uniquely identifies a resource on the web. As an example, URLs can identify web sites. URLs of web sites are commonly input into a web browser to cause the browser to navigate to the respective web site. In addition, URLs are often associated with selectable links (often called "hyperlinks") within a web site. Selection of a hyperlink causes the browser to navigate to the web site identified by the URL associated with the hyperlink.

URLs can be used in other ways as well. For example, a URL can be input into a chat window, which can potentially cause the system to render a limited preview of the web site. As an example, the preview might include an image, limited text, and perhaps a hyperlink that, when selected, allows for navigation to the web site associated with the link. This gives the user a better idea of what the web site offers as compared to simply presenting only the text of the URL. Thus, the user knows a little more about the web site to allow the user to make a more informed decision on whether to select the hyperlink. Once the user selects the hyperlink and has navigated to the web site, the user can then navigate through the web site (e.g., by selecting hyperlinks or controls) to perform various actions while at the web site.

As an example, the user might navigate to a web site that offers products for sale, and then thereafter perform actions to purchase a product. As another example, the user might navigate to a web site that is promoting an event, and thereafter select hyperlinks or controls to find out more about the event, buy tickets for the event, or find out where on a map the event is. As yet another example, the user might navigate to a restaurant web site, and thereafter view a menu, or make reservations.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some embodiments described herein relate to the generation of a web site preview based on client presentation state of the client computing system(s) that will render the web site preview. In accordance with one embodiment described herein, upon a service computing system receiving a request to provide preview data for a web site preview corresponding to a web site identifier, the service computing system determines client presentation state of one or more client computing systems that is or are to render a web site preview using preview data that is to be provided in response to the request. The service computing system selects a preview template at least in part based on the determined client presentation state. The service computing system also populates the selected preview template with content from the web site to thereby generate preview data representing a preview of the web site identified by the web site identifier.

The service computing system then responds to the request with the preview data. That preview data defines how the web preview will appear on the client computing system. Thus, the client computing system uses the preview data to render the web preview. Because the web preview is formulated taking into consideration presentation state of the client computing system that renders the web site preview, the web site preview is better matched with that presentation context, and thus has better appearance, and occupies an appropriate amount of space.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Some embodiments described herein relate to the generation of a web site preview based on client presentation state of the client computing system(s) that will render the web site preview. In accordance with one embodiment described herein, upon a service computing system receiving a request to provide preview data for a web site preview corresponding to a web site identifier, the service computing system determines client presentation state of one or more client computing systems that is or are to render a web site preview using preview data that is to be provided in response to the request. The service computing system selects a preview template at least in part based on the determined client presentation state. The service computing system also populates the selected preview template with content from the web site to thereby generate preview data representing a preview of the web site identified by the web site identifier.

The service computing system then responds to the request with the preview data. That preview data defines how the web preview will appear on the client computing system. Thus, the client computing system uses the preview data to render the web preview. Because the web preview is formulated taking into consideration presentation state of the client computing system that renders the web site preview, the web site preview is better matched with that presentation context, and thus has better appearance, and occupies an appropriate amount of space.

Figure 1:
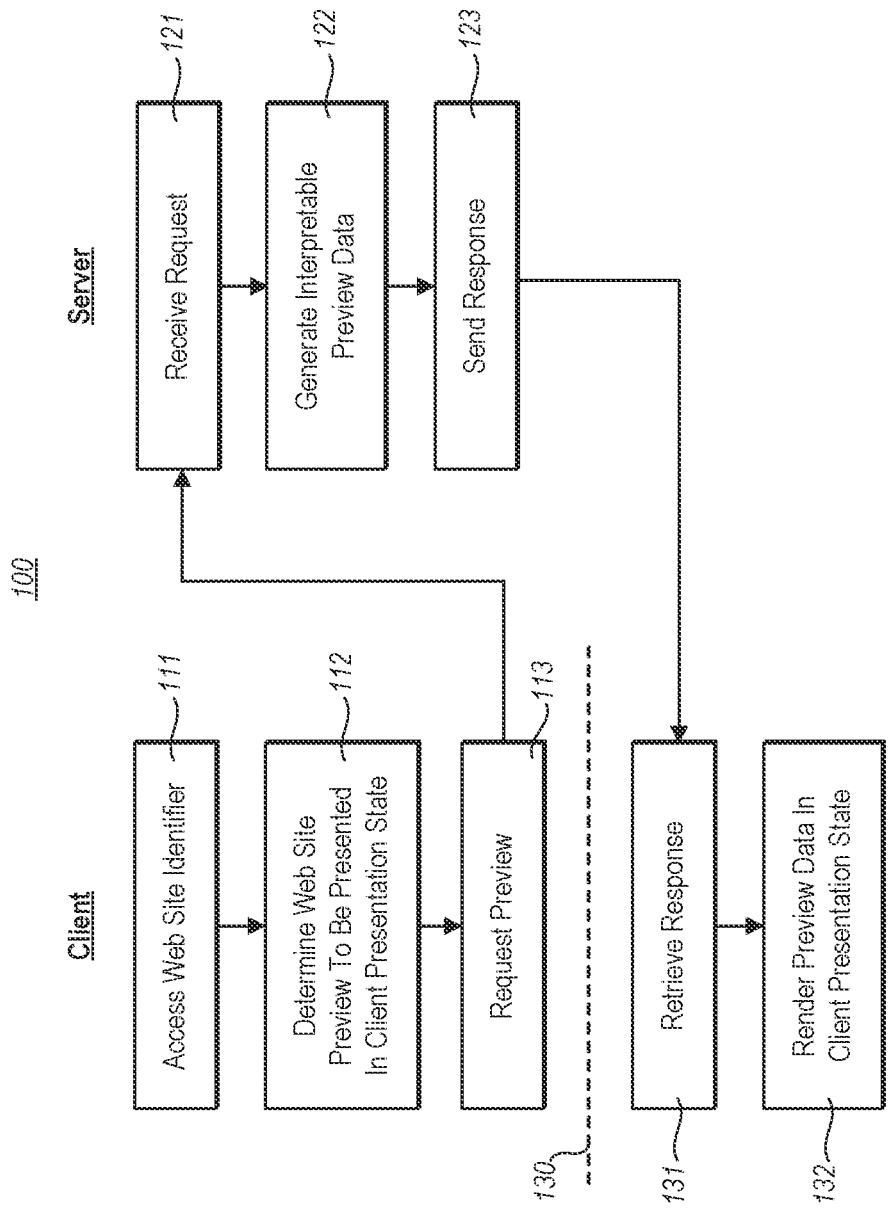
FIG. 1 illustrates a flowchart of a method for generating a web site preview based on a web site identifier and a client presentation state, in accordance with the principles described herein.
Figure 2:
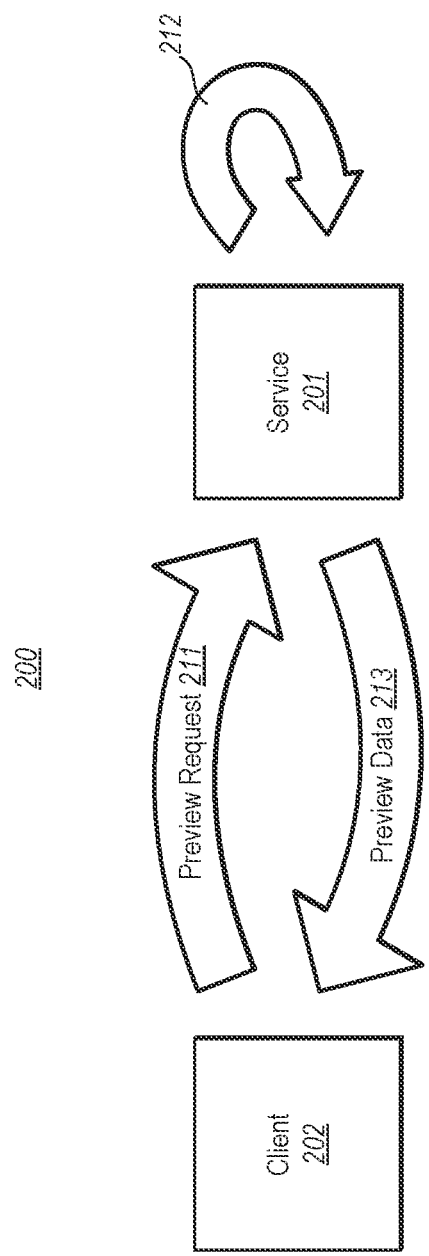
FIG. 2 illustrates a network environment that includes a client computing system and a preview service computing system, which represents an example environment in which the method of FIG. 1 may be performed.

FIG. 1 illustrates a flowchart of a method 100 for generating a web site preview based on a web site identifier, in accordance with the principles described herein. As an example only, the web site identifier may be a Uniform Resource Locator (or URL). FIG. 2 illustrates a network environment 200 which represents an example of an environment in which the principles described herein may operate, and represents an example environment in which method 100 may be performed. Accordingly, the method 100 of FIG. 1 will be described with reference to FIG. 1 as well as with reference to the network environment 200 of FIG. 2. Referring to FIG. 2, the network environment 200 includes a service computing system 201 and a client computing system 202. Each of the computing systems 201 and 202 may be structured as described below for the computing system 900 of FIG. 9.

Some of the acts of the method 100 are performed by a client computing system, such as the client computing system 202 of FIG. 2, and are illustrated in the left half of FIG. 1 under the heading "Client". Others of the acts of the method 100 are performed by a service computing system, such a service computing system 201 of FIG. 2, and are illustrated in the right column of FIG. 1 under the heading "Service". The modifiers "client" and "service" with respect to a computing system herein are merely to distinguish computing systems that generate the request for the preview and/or that renders the web site preview (i.e., the "client" or the "client computing system") from a computing system that generates the preview data (i.e., the "service" or the "service computing system").

The method 100 includes the client computing system accessing a web site identifier (act 111), determining that a web site preview of the web site identified by the web site identifier is to be presented in a client presentation state (act 112), and causing a request for a preview of the web site identified by the web site identifier to be dispatched to a service computing system (act 113). A client computing system then receives a response to the request with the preview data (act 131), and renders the preview in the client application state using the preview data (act 131).

Before turning to the acts performed by the service computing system, the meaning of the dashed line 130 will now be described. The dashed line 130 represents that acts 111 through 113 may be performed by one client computing system, and that the acts 131 and 132 may be performed by that same client computing system, or perhaps by a different computing system. That is, one client computing system may dispatch a request for a preview to the service computing system, while that same client computing system and/or one or more other client computing systems may each receive the response and renders the web site preview based on preview data within the response.

As mentioned above, the client application that generates the preview request identifies client presentation state in which the requested web site preview will be rendered (refer to act 112). This client presentation state could be any state that could impact how the web site preview appears. As an example, the client presentation state could be an application (i.e., an application identifier) in which the web site preview will be rendered. Examples of such applications may include particular identified social media applications, video conferencing applications, group chat applications, or the like.

As another example, the client presentation state could be a state of an application in which the web site preview is to be rendered. As an example, the state of the application could be that a chat state is active, that a particular window that is to be rendered is active or of a particular size, and so forth. As another example, the presentation state could represent whether a window in which the web site preview state will appear is a chat window between only two client computing systems, or a group chat window with a larger number of participants.

Figure 3:
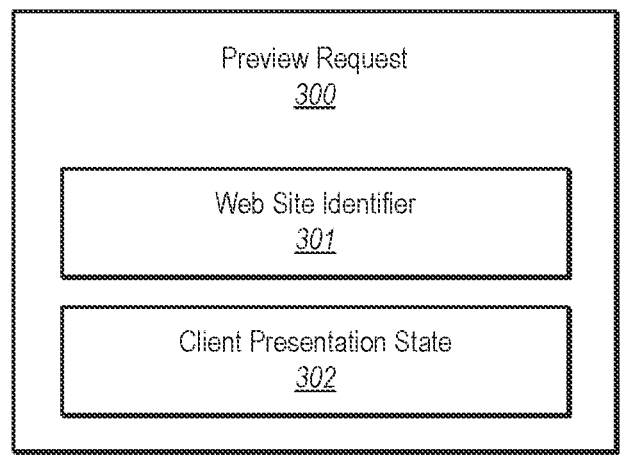
FIG. 3 illustrates a data structure of a preview request that includes a web site identifier for which the preview data is to be generated, as well as client presentation state identifying a client presentation state in which the web site preview is to be rendered.

As for the service computing system, the service computing system receives a request to provide preview data for a web site preview corresponding to a web site identifier (act 121). In FIG. 2, the transmission of the request is represented by the arrow 211. FIG. 3 illustrates a data structure of a preview request 300. The preview request 300 includes the web site identifier 301 for which the preview data is to be generated, as well as client presentation state 302 identifying a client presentation state 303 in which the web site preview is to be rendered. The preview request 300 could include other data as well, but these two data items 301 and 302 are the only data that will be referenced herein.

In response to receiving the preview request (act 121), the service computing system generates preview data representing a preview of a web site represented by the web site identifier (act 122). In FIG. 2, the generation of the preview data based on the web site identifier is represented by the circular arrow 212. The preview data is structured to be interpreted by the client computing system to cause the client computing system to render a web site preview. In some embodiments, the web site preview is defined by the preview data. Thus, by appropriately generating the preview data, the service computing system controls how the web site preview is rendered by the client computing system.

In accordance with the method 100, after the preview data is generated (act 122), the service computing system then causes the generated preview data to be sent to the client computing system (act 123). As an example, in FIG. 2, the service computing system 201 sends (as represented by the arrow 213) the preview data to the client computing system 202. At the client computing system, the preview data may then be interpreted to render the web site preview in the client presentation state. Thus, the user is provided a web site preview associated with a web site identifier.

The client application that submits the preview request may identify that there is more than one client presentation state in which the web site preview may appear. This may be true even if the multiple previews are to be displayed in the same application. In such a case, in response to receiving the preview request (act 121) that includes multiple different presentation states of the application, the service computing system generates different preview data representing a different preview data of a web site represented by the same web site identifier requested by the same application under different client presentation states (act 122). For example, a same application may include at least two different presentation states. As an example, there may be a first state that is a messaging session in an ongoing real time meeting, and a second state may be a messaging session in a pure chat thread not associated with a real time meeting. A same web site identifier corresponding to the same website posted in the first and second states will generate different preview displays in the messaging session in an ongoing real time meeting and the message session in a pure chat thread not associated with a real time meeting, respectively.

In another embodiment, two or more different applications, executing on a requesting device, include different client presentation states. In response to receiving the preview request (act 121) that embedding different presentation states of the application, the service computing system generates different preview data representing a different preview of a web site represented by the same web site identifier requested by different applications (act 122).

Figure 4:
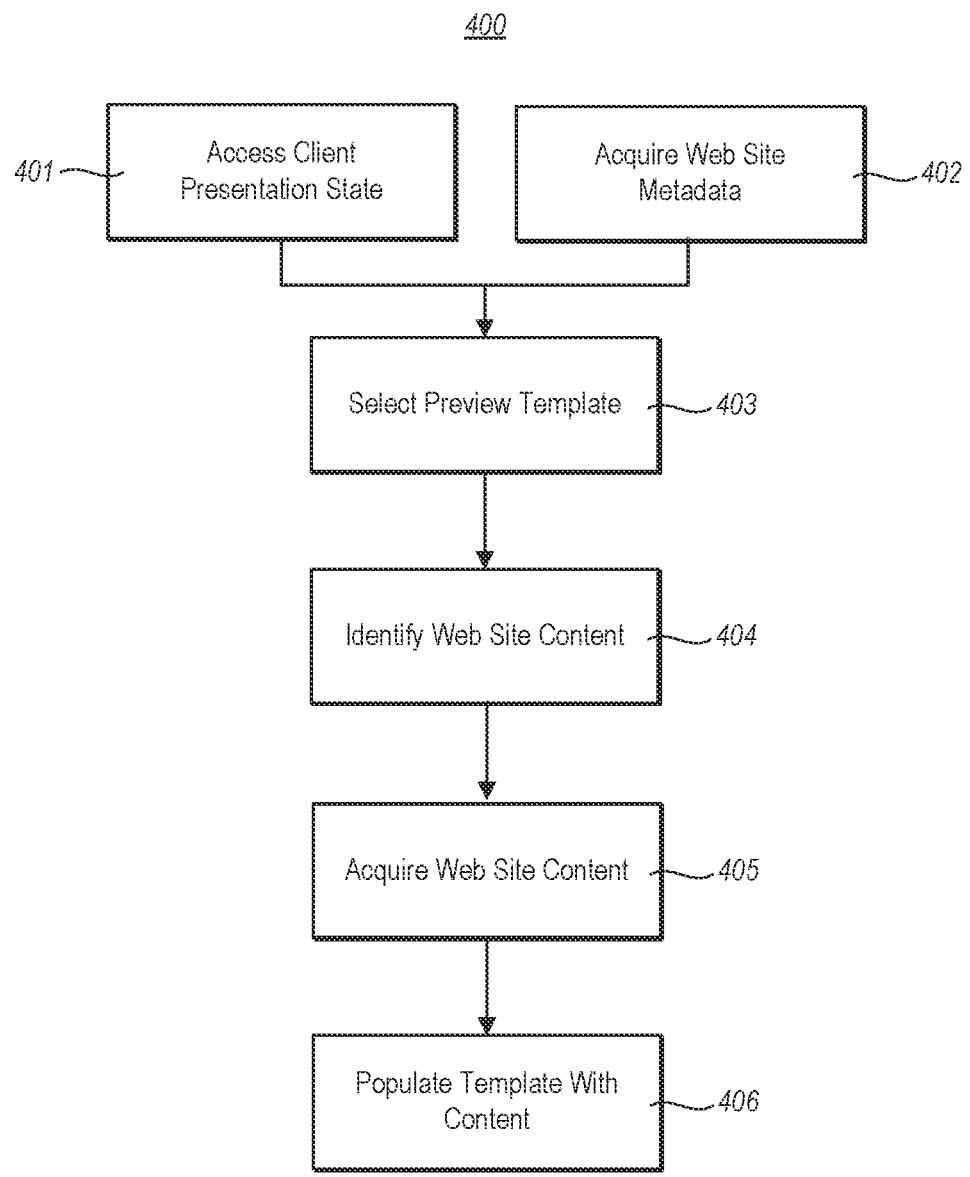
FIG. 4 illustrates a flowchart of a method for generating a preview of the web site identified by the web site identifier by using templates, in accordance with one embodiment described herein.
Figure 5:
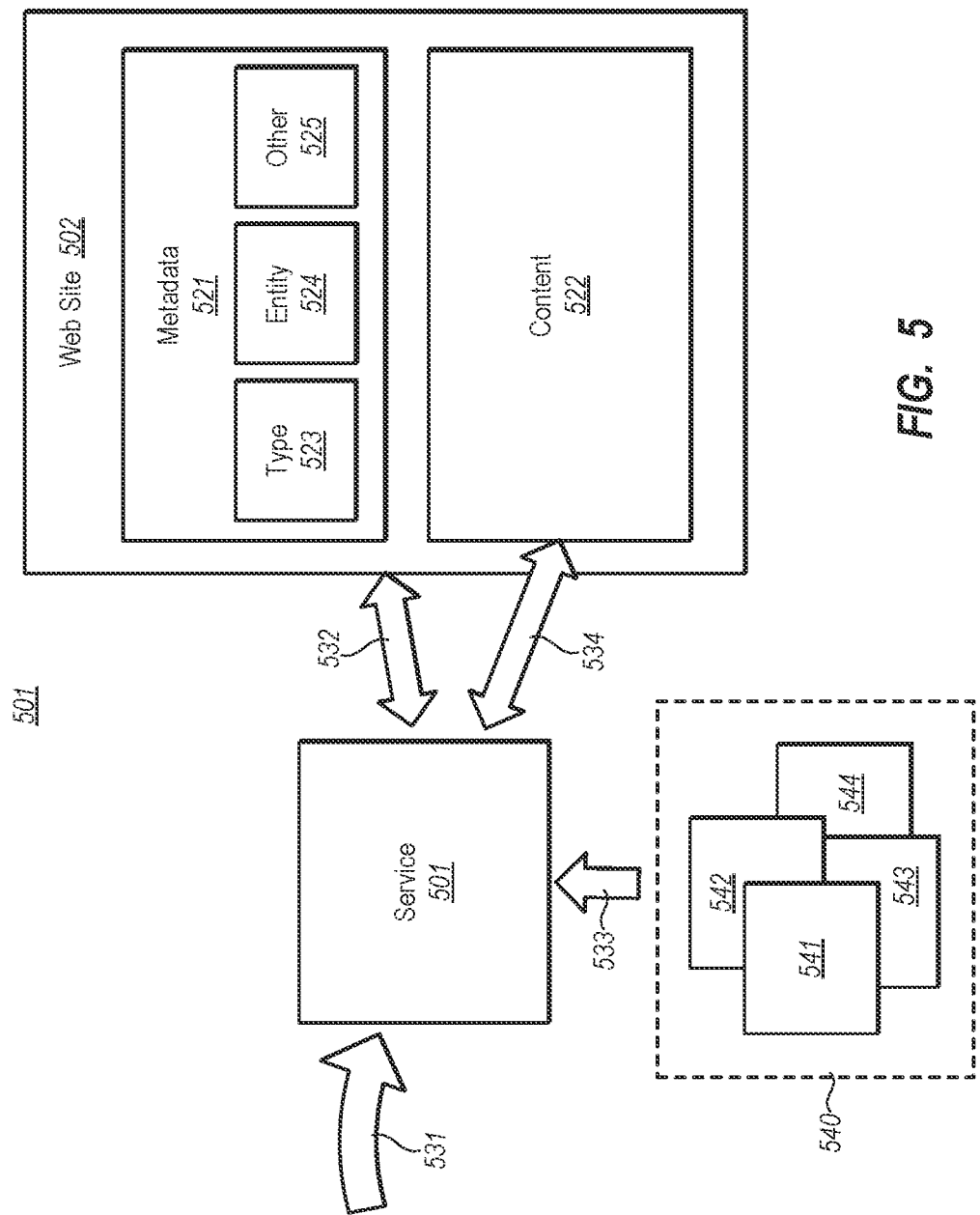
FIG. 5 illustrates an environment in which the method of FIG. 4 may be performed, including a service interacting with a web site and a collection of preview templates.

FIG. 4 illustrates a flowchart of a method 400 for the service computing system generating the preview data, which represents an example of the act 122 of FIG. 1. Since act 121 has already occurred, the service computing system already has the web site identifier prior to the method 400 beginning. FIG. 5 illustrates an example environment 500 in which the method 400 may be performed. The environment 500 includes a service computing system 501 and a web site 502. The service computing system 501 has received (as represented by arrow 531) a preview request from a client computing system. The service computing system 501 is an example of the service computing system 201 of FIG. 2. The method 400 of FIG. 4 will now be described with respect to the environment 500 of FIG. 5.

In accordance with the method 400, the service computing system accesses the client presentation state from the preview request (act 401). For instance, if the preview request was the preview request 300 of FIG. 3, the service computing system may access the client presentation state 302 from the preview request 300. The selection of the preview template will be at least in part upon this client presentation state.

As one additional possibility, the selection of the preview template may additionally take into consideration web site metadata of the web site for which a preview is being generated. In that case, the service computing system would use the web site identifier within the preview request to navigate to the web site, and obtain the relevant metadata from that web site. As an example, if the preview request was the preview request 300 of FIG. 3, the service computing system would use the web site identifier 301 to navigate to the web site itself to thereby obtain the relevant metadata.

For example, in FIG. 5, the service computing system 501 navigates to the web site 502. If the web site identifier was a URL, then the service could simply use standard web navigation to navigate to the web site. After navigating to the web site (act 501), the service computing system then accesses the relevant web site metadata from the web site 502. The web site 502 is illustrated as including web site metadata 521 and web site content 522. As an example, the metadata 521 could include a type 523 of the web site, perhaps an entity 524 that provides the web site, and potentially other information 525. Such may be structured in accordance with a schema specified within the web site. For instance, the schema might be a version of a schema provided by schema.org. The obtaining of this metadata is represented in FIG. 5 by bi-directional arrow 532.

The preview template is then selected (act 403) based on the client presentation state, as well as potentially based on any of the web site metadata (such as the type 523 of the web site, the entity 524 of the web site, and so forth). For example, the service computing system 501 may have access to a preview template collection 540. In this example, the collection 540 has four preview templates 541 through 544, but this is just a simple example only. There may be countless preview templates available to the service computing system 501. In this example, suppose that the service selects preview template 542, which selection is represented by arrow 533.

The fields within the template define what content of the web site is to be used to populate the template. This includes what action controls to populate into the template, and where. Accordingly, the service uses the template to determine what content to populate into the template (act 404). As an example, if the selected template is preview template 542, the preview template 542 defines what content of the web site to populate into the preview template.

The preview service may then acquire the appropriate content of the web site (act 405) as represented by bi-directional arrow 534. Although the arrows 532 and 534 are shown separately, all information (metadata and content) required to generate the preview may be acquired from the web site 502 from a single request and response.

The service computing system then populates that content into the web site template (as an example of act 406). The populated preview template may then serve is the generated preview data that is then sent to the client. This preview data may be for example, a data interchange format object, such as a JSON object, which is a sequence of declarations that defines how to render the web site preview. The client may then interpret the preview data to thereby render the web site preview with the client presentation state.

Figure 6:
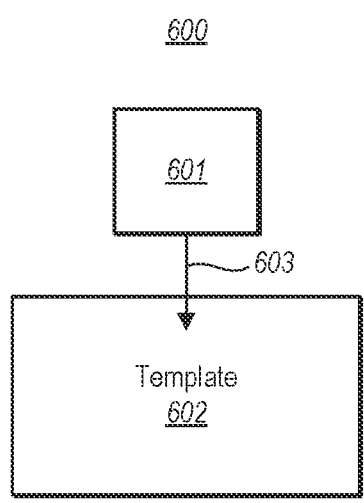
FIG. 6 illustrates a data flow in which some web site content is populated into a copy of the selected preview template, which in one example generates the preview data that is returned to the client.

FIG. 6 illustrates a data flow 600 in which some web site content 601 is populated (as represented by arrow 603) into a copy of the selected template 602, which in one example generates the preview data that is returned to the client. In another embodiment, the preview data sent to the client includes the web site content 601 and the unpopulated template 602 (perhaps as a single JSON object or multiple JSON object). The client would then populate the appropriate portion of the content 602 into the unpopulated template 601 as part of rendering the preview data. This has a disadvantage in that it relies upon the client having the capability to perform binding of content 602 into the template 601, which not all clients may have. On the other hand, rendering declarative sequences (such as JSON objects) is a much more universal operation that client computing systems are typically capable of doing. This is an advantage of providing the preview data as an already populated copy of the template.

Figure 7A:
FIG. 7A illustrates an example of a web site preview associated with a particular web site identifier to be presented in one client presentation context.
Figure 7A:
Figure 7A:
Figure 7B:
FIG. 7B illustrates a web site preview associated with that same web site identifier but to be presented in a different context.

Accordingly, the principles described herein allow for different previews of a web site to be presented (even for the same web site) depending on the client presentation state in which the web site preview will be presented. FIG. 7A illustrates an example of a web site preview associated with a particular web site identifier to be presented in one client presentation context, whereas FIG. 7B illustrates a web site preview associated with that same web site identifier but to be presented in a different context.

Specifically, FIG. 7A illustrates a text chat window 700A in which a user has sent a chat to Carol (a fictional person) and pasted a web site identifier that results in a preview being rendered within the chat window. The preview includes various static information including the names of passengers, the route, and flight number. However, there is an output control that shows status that can be updated as the flight progresses. Furthermore, the departure time and arrival time may also be in distinct output control that are updated. The preview also includes a navigation control that may be selected from this preview itself to obtain flight tracking information from a separate flight tracking service. FIG. 7B illustrates a more limited preview that is suitable for other client presentation contexts, which illustrates basic static information about the flight, as well as the output control that shows the updated status of the flight.

As described above, the template is selected at least in part based on the web site metadata. As an example, the web site metadata may include a type of web site. For example, a product web site (of type "product") may by default result in the selection of a product web site preview, a restaurant web site (of type "restaurant") may by default result in selection of a restaurant web site preview, an airline web site (of type "airline") may by default result in selection of an airline web site. Such selection does not rely on any input by the web site owner itself. Instead, the selection merely by default pivots on the value of the type field in the web site metadata.

Typically, when a web site preview is presented to a user, the preview may act as a hyperlink (or otherwise contain a hyperlink) that when selected, navigates the user to the web site that was previewed by the web site preview. Then, the user can interact with the web site as normal including interacting with any controls provided by the web site. However, in accordance with some embodiments of the principles described herein, one or more controls of the web site are provided within the web site preview itself. Thus, a user can use those controls without even navigating to the web site.

Figure 8:
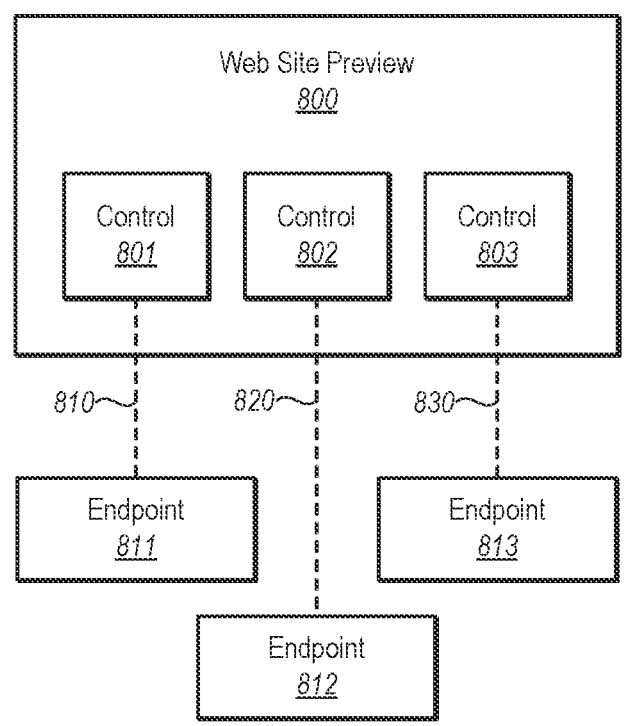
FIG. 8 illustrates a general example of a web site preview that includes three controls, each with an associated endpoint identifier that facilitates connection to an associated endpoints with respect to interactivity with the control.

For illustrative purposes only, FIG. 8 illustrates a general example of a web site preview 800 that includes three controls 801, 802 and 803, each with associated endpoints identifiers 811, 812 and 813. The endpoint identifiers can be any identifier that the client computing system can use to further connection to the endpoint identified by the associated endpoint identifier. In one example, such endpoint identifiers are also URLs. The web site preview may include other web site content as well, such as images, text (e.g., descriptions, summaries, titles), and others, although this other content is not represented in FIG. 8 in order to allow for focus on the controls themselves. FIG. 8 is just an example. The principles described herein are not limited to the number of action controls within a web site preview.

As represented by dashed lines 810, 820 and 830, each control is associated with endpoint identifiers 811, 812 and 813 respectively. The controls also have corresponding configurations 821, 822 and 823 that define the type of connection that is facilitated by the respective control. Thus, the control 801 facilitates a specific type of connection defined by the configuration 821 to the endpoint identified by the endpoint identifier 811. Furthermore, in this example, the control 802 facilitates a specific type of connection defined by the configuration 822 to the endpoint identified by the endpoint identifier 812. Lastly in this example, the control 803 facilitates a specific type of connection defined by the configuration 823 to the endpoint identified by the endpoint identifier 813. The preview data is generated to be structured to be interpreted by the client computing system to cause the client computing system to render the web site preview with an action control associated with an action and that facilitates connection to the endpoint identified by the endpoint identifier.

One example of a connection type is a navigation connection type in which the client computing system is navigated to the endpoint in response to its user interacting with the control. Such a control will be referred to herein as a "navigation control". Another example of a connection type is an input connection type in which the user can provide input (e.g., text, a Boolean, a selection from a group, or the like) to the connected endpoint. Such a control will be referred to herein as an "input control". Another example of a connection type is an output connection in which the endpoint provides data to populate into the control, and perhaps even update that data. Such a control will be referred to herein as an "output control".

These are just three different examples of a connection type and associated control type. The principles described herein apply regardless of the type of connection that the control facilitates. Furthermore, the principles described herein apply regardless of the form of the control, regardless of layout, design, color, size, shape, user interactivity types, and so forth.

Examples of navigation controls will now be described. For instance, if the web site is a restaurant web site, an example navigation control could be a description control, that when interacted with, takes the user to a description endpoint maintained by the restaurant that is perhaps managed by the restaurant. As another example, there may also be a navigation control in the form of a menu control that when interacted with, takes the user to a menu endpoint maintained by the restaurant that presents a menu of the restaurant. These endpoints may for instance be within the domain of the web site that is being previewed (in this case, the restaurant web site).

However, there may also be controls with endpoints that are completely outside of the domain of the restaurant web site. As examples, there may be a navigation control to make a reservation for the restaurant, which when interacted with takes the user to a reservation service endpoint that is not managed by the restaurant web site. As another example, the restaurant web site preview may provide a navigation control to provide a map to see where the restaurant is and/or get directions to the restaurant, which when interacted with takes the user to a mapping service endpoint that is also not managed by the restaurant web site. The same web site preview may provide a navigations control that when interacted with takes a user to a review service that is also not managed by the restaurant web site. Thus, the controls may provide functionalities that link to services that are familiar to the user, and thus are easily and comfortably navigated. Furthermore, the web site that has the preview need not themselves provide the services that underlie each control in the preview. Instead, the controls may link to endpoints that are outside of the domain of the web site.

As an example of an input control, there may be an input control that allows the user to add their name to a waitlist, which when interacted with provides a user identifier to the endpoint that registers those waiting for a table. As an example of an output control, the restaurant may generate an output control that shows wait time, which updates to reflect a time estimate for minutes remaining until their table is available. As another example of an output control this time in the context of an airline web site, the output control may update to reflect the real-time status of a flight (e.g., on time, in flight, delayed, landed, and so forth) of a flight. There might be another control that may be interacted with to connect to a flight tracker service, to thereby present the user with a flight tracking update.

Thus, the user has a consistent preview across all product web site previews, across all restaurant web site previews, and so forth, where those web site previews are tailored towards the type of web site. The user is thereby given an intuitive web site preview. Such web site previews may be generated with the aim of providing a robust and rich experience for the user that views and/or interfaces with the web site preview, and may consider input from other stakeholders. Because the service controls how the web site preview appears, rather than have such control left to each client, the user is provided with a much more consistent user experience. Furthermore, because the service computing system is a service that may operate in a cloud computing environment that has abundant processing, memory and storage resources, the generation of the preview may consider a variety of factors and be the result of complex processing, thereby providing a more substantial web site preview.

Alternatively, or in addition, relevant metadata used to select the preview template may be the entity expressed in the metadata of the web site. This is the provider of the web site. In one embodiment, that entity can register a particular preview template with the preview service. Thus, in this embodiment, the selection of the preview template depends on the entity.

As another example, the selection may be based on a screen size of the client that is to render the web site preview. The screen size may be identified within the request from the client to the preview service. The entity may register a different preview template based on each of multiple screen sizes. Alternatively, or in addition, the selection may be based on both a type of web site as well as the screen size of the client. Thus, the web site entity, the type of the web site, the context in which the preview will be rendered, and the screen size of the client that will render the preview (or various combinations of the above) may be used to select the appropriate preview template.

Accordingly, the principles described herein provide a rich preview experience, where generation of the preview is determined based on data performed at a preview service, and in which the user may interact directly with the preview, rather than having to navigate to the associated web site.

Because the principles described herein are performed in the context of a computing system, some introductory discussion of a computing system will be described with respect to FIG. 9. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
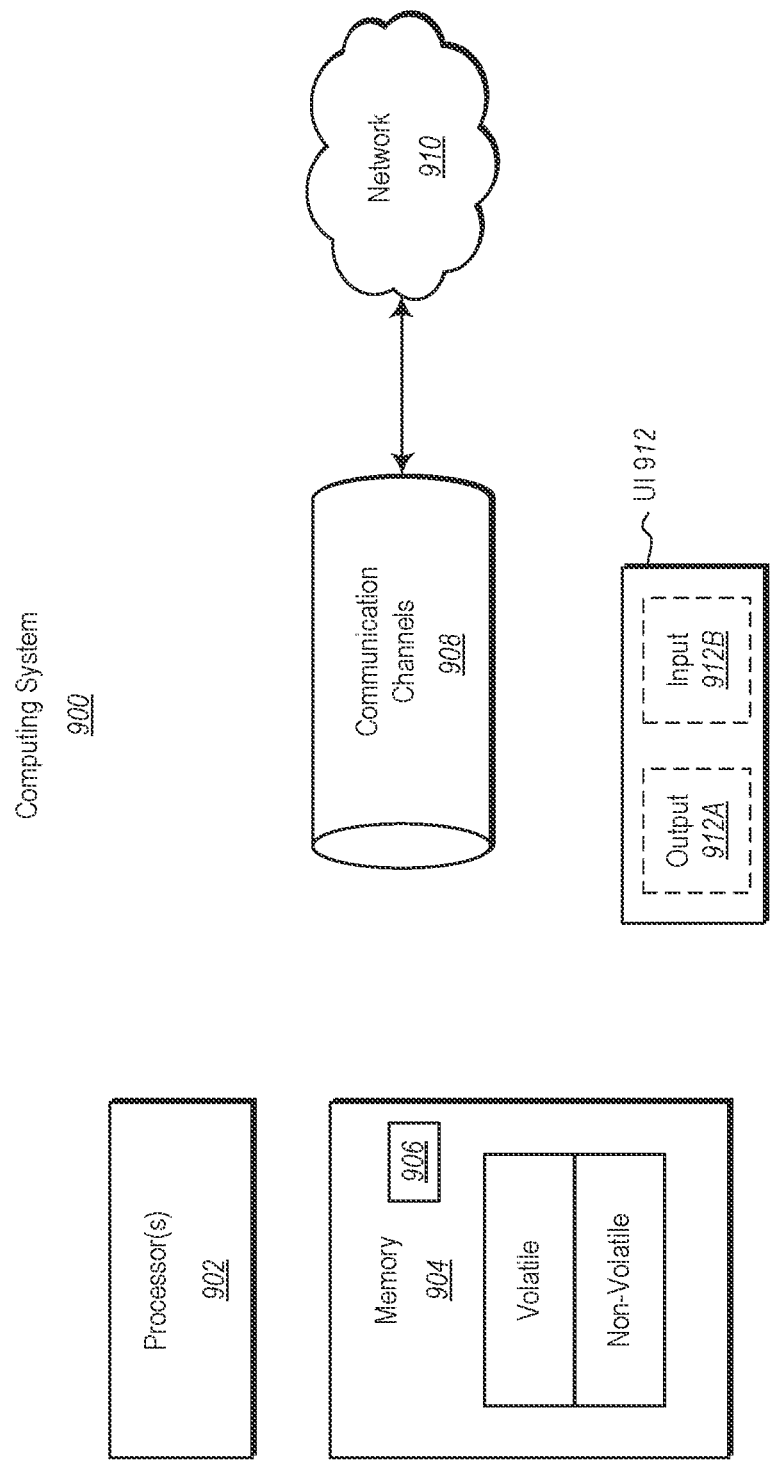
FIG. 9 illustrates an example computing system in which the principles described herein may be employed.

As illustrated in FIG. 9, in its most basic configuration, a computing system 900 includes at least one hardware processing unit 902 and memory 904. The processing unit 902 includes a general-purpose processor. Although not required, the processing unit 902 may also include a field programmable gate array (FPGA), an application specific integrated circuit (ASIC), or any other specialized circuit. In one embodiment, the memory 904 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 900 also has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, virtual or augmented reality, holograms and so forth. Examples of input mechanisms 912B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A service computing system that generates a web site preview based on a client presentation state, said service computing system comprising:
   one or more processors; and
   one or more hardware storage devices that store instructions that are executable by the one or more processors to cause the service computing system to:
      receive a request to provide preview data for the web site preview, which corresponds to a web site identifier;
      determine a client presentation state of a client computing system that is to render the web site preview using the preview data that is to be provided in response to the request, wherein the web site preview is interactable to navigate to a web site identified by the web site identifier;
      select a preview template based on the determined client presentation state, the selecting occurring without user intervention, wherein the client presentation state includes an identification of an application in which the web site preview is to be rendered on the client computing system, the identified application being one of a social media application, a video conferencing application, or a group chat application, and wherein the presentation state further includes a state of the application, said state including one of: an active or inactive state of the social media application, and active or inactive state of the video conferencing application, or an active or inactive state of the group chat application;
      generate the web site preview with a display property as a first value in response to the client presentation state being a first value, or, alternatively, generate the web site preview with the display property as a second value in response to the client presentation state being the second value, wherein said generation of the web site preview further includes populating the selected preview template with content from the web site to thereby generate the preview data representing a preview of the web site identified by the web site identifier, the preview data being structured to be interpreted by the client computing system to cause the client computing system to render the web site preview, the preview data defining how the web site preview will be rendered, wherein the populated preview template forms the web site preview; and
      respond to the request with the preview data.

2. The service computing system in accordance with claim 1, the instructions being further executable to cause the service computing system to determine the client presentation state from content of the request.

3. The service computing system in accordance with claim 1, the client presentation state comprising an application in which the web site preview is to be rendered.

4. The service computing system in accordance with claim 1, the client presentation state comprising a state of an application in which the web site preview is to be rendered.

5. The service computing system in accordance with claim 1, the client presentation state comprising a state of a window in which the web site preview is to be rendered.

6. The service computing system in accordance with claim 1, the client presentation state representing that the web site preview is to be presented in a chat window having only two participants.

7. The service computing system in accordance with claim 1, the client presentation state representing that the web site preview is to be presented in a group chat window.

8. The service computing system in accordance with claim 1, the client presentation state representing that the web site preview is to be presented in a social media application.

9. The service computing system in accordance with claim 1, the preview template also selected based on a type of the web site that is identified by the web site identifier.

10. The service computing system in accordance with claim 1, the preview template also selected based on an entity of the web site that is identified by the web site identifier.

11. The service computing system in accordance with claim 1, the preview data having one or more controls and associated endpoints.

12. The service computing system in accordance with claim 1, wherein the generated preview data is in a data interchange text format.

13. A computer-implemented method performed by a service computing system to generate a web site preview based on a client presentation state, the method comprising:
   receiving a request to provide preview data for the web site preview corresponding to a web site identifier;
   determining a client presentation state of a client computing system that is to render the web site preview using the preview data that is to be provided in response to the request, wherein the web site preview is interactable to navigate to the web site identified by the web site identifier;
   selecting a preview template based on the determined client presentation state, the selecting occurring without user intervention, wherein the client presentation state includes an identification of an application in which the web site preview is to be rendered on the client computing system, the identified application being one of a social media application, a video conferencing application, or a group chat application, and wherein the presentation state further includes a state of the application, said state including one of: an active or inactive state of the social media application, and active or inactive state of the video conferencing application, or an active or inactive state of the group chat application;

generating the web site preview with a display property as a first value in response to the client presentation state being a first value, or, alternatively, generate the web site preview with the display property as a second value in response to the client presentation state being the second value, wherein said generation of the web site preview further includes populating the selected preview template with content from the web site to thereby generate the preview data representing a preview of the web site identified by the web site identifier, the preview data being structured to be interpreted by the client computing system to cause the client computing system to render the web site preview, the preview data defining how the web site preview will be rendered, wherein the populated preview template forms the web site preview; and responding to the request with the preview data.

14. The method in accordance with claim 13, the client presentation state comprising an application in which the web site preview is to be rendered.

15. The method in accordance with claim 13, the client presentation state comprising a state of an application in which the web site preview is to be rendered.

16. The method in accordance with claim 13, the client computing system being one client included among a plurality of computing systems.

17. The method in accordance with claim 13, the preview template also selected based on a type of the web site that is identified by the web site identifier.

18. A computer readable hardware device storing computer instructions, the computer instructions are executed by one or more processors to perform a method comprising:

receiving a request to provide preview data for the web site preview corresponding to a web site identifier;

determining a client presentation state of a client computing system that is to render the web site preview using the preview data that is to be provided in response to the request, wherein the web site preview is interactable to navigate to the web site identified by the web site identifier;

selecting a preview template based on the determined client presentation state, the selecting occurring without user intervention, wherein the client presentation state includes an identification of an application in which the web site preview is to be rendered on the client computing system, the identified application being one of a social media application, a video conferencing application, or a group chat application, and wherein the presentation state further includes a state of the application, said state including one of: an active or inactive state of the social media application, and active or inactive state of the video conferencing application, or an active or inactive state of the group chat application;

generating the web site preview with a display property as a first value in response to the client presentation state being a first value, or, alternatively, generate the web site preview with the display property as a second value in response to the client presentation state being the second value, wherein said generation of the web site preview further includes populating the selected preview template with content from the web site to thereby generate the preview data representing a preview of the web site identified by the web site identifier, the preview data being structured to be interpreted by the client computing system to cause the client computing system to render the web site preview, the preview data defining how the web site preview will be rendered, wherein the populated preview template forms the web site preview; and responding to the request with the preview data.

* * * * *